April 6, 1926.
B. J. OWEN
1,579,239
METHOD AND APPARATUS FOR DRYING CROPS ARTIFICIALLY
Filed Feb. 27, 1925    2 Sheets-Sheet 1
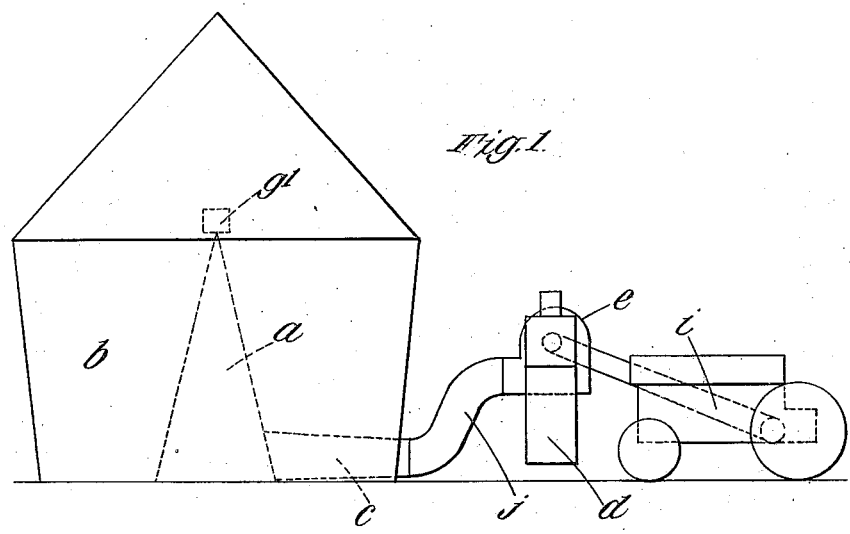
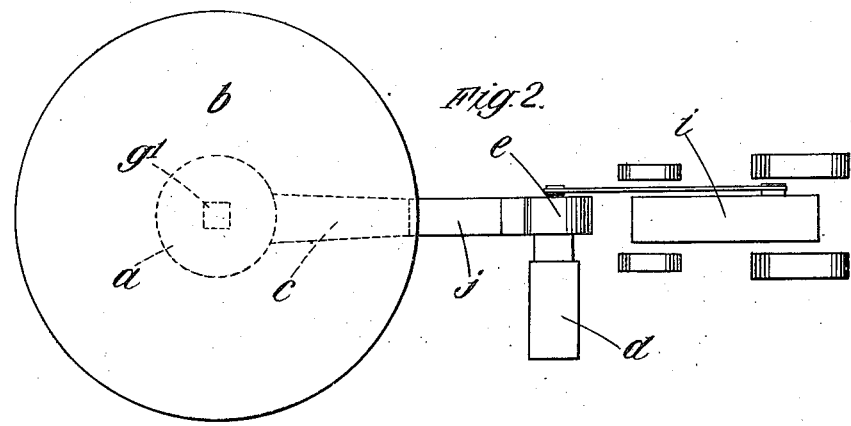
INVENTOR:
Brynar James Owen
BY: Francis E. Boyce
ATTORNEY

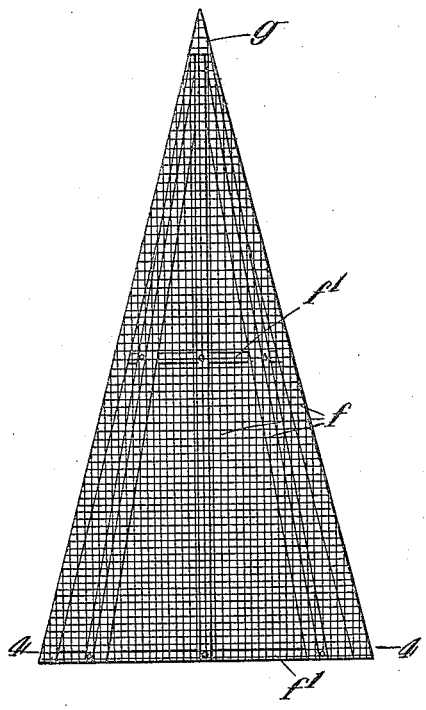
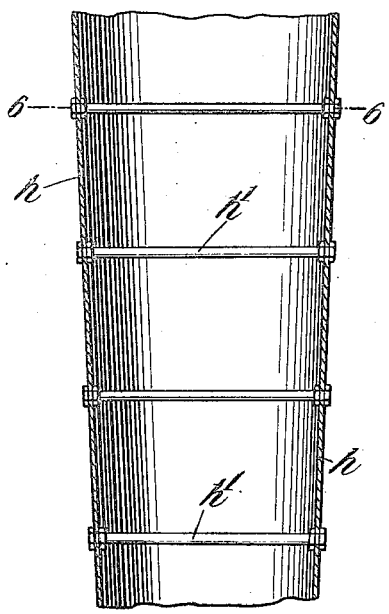
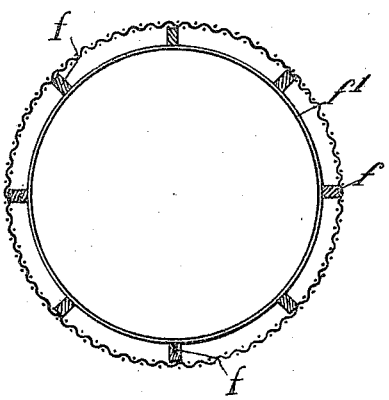
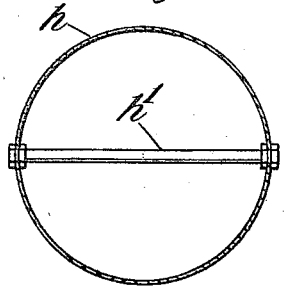

Patented Apr. 6, 1926.

1,579,239

UNITED STATES PATENT OFFICE.

BRYNAR JAMES OWEN, OF OXFORD, ENGLAND.

METHOD AND APPARATUS FOR DRYING CROPS ARTIFICIALLY.

Application filed February 27, 1925. Serial No. 12,048.

*To all whom it may concern:*

Be it known that I, BRYNAR JAMES OWEN, a subject of the King of Great Britain, residing at Augle House, Woodstock Road, in the city of Oxford, in the county of Oxford, England, have invented certain new and useful Improvements in Methods and Apparatus for Drying Crops Artificially, of which the following is a specification.

The present invention relates to the artificial drying of crops, and has for its object to enable the drying of such materials, which are usually piled in the form of stacks or ricks after cutting or gathering, to be effected in a complete and expeditious manner in spite of adverse atmospheric and other conditions, thereby obviating impairment of the crop and wastage of time, particularly in the case of late harvesting.

It has been hitherto proposed to effect the drying of hay-stacks and the like by means of a blast of cold atmospheric air, the method employed consisting broadly in permitting natural oxidation or fermentation to take place within the said stacks owing to the excess of organic moisture and in subjecting the material to periodic blowing in order to reduce the consequent rise in temperature, the blowing operation being repeated at intervals until the said material is dried. Such a method, however, has been found to be unsuitable for practical purposes owing, amongst other reasons, to the undue establishment of mould and to the appreciable loss of material entailed thereby.

It has been also proposed to effect the drying of hay-stacks and the like by means of heated or dried air, and to employ in that connection, apart from the usual perforated ventilating shafts or pipes, a cone-shaped ventilating flue which is disposed inside the stack and divided into separate inter-communicating compartments, the latter being provided with adjustable damping devices whereby the flow of air to the stack may be regulated and the ventilating may be allowed to proceed as the stacking progresses.

The present invention consists essentially in forming within the stack of material to be treated a hollow chamber or space which is so shaped and dimensioned in relation to the particular stack and which is so supplied with heated air that the conformation and proportions of the said chamber or space and the conditions under which the air is delivered thereinto ensure, as far as possible, that the air is distributed by means of the said chamber or space equally in all directions and penetrates the mass of material uniformly at all points. In carrying the said invention into practice, the aforesaid hollow chamber or space is formed by means of a suitably shaped and dimensioned structure or framework of any convenient type about which the material to be treated is stacked, air from the open atmosphere being heated to the requisite temperature and being driven or forced into the said chamber or space by way of a suitably designed delivery duct or pipe at a rate and under a pressure which are determined by the size and nature of the particular stack.

The utilization as aforesaid of the great absorptive properties of relatively highly heated air ensures that the moisture in the material is rapidly removed by means of transpiration, which is greatly increased by low humidity and high temperature, and that the rapid removal of the excess moisture prevents any undue fermentation, which has been found to be unnecessary for the maturing of crops such as hay.

An apparatus or plant for carrying the said invention into practice is illustrated, by way of example, in the accompanying drawing in which:

Figures 1 and 2 are, respectively, a diagrammatic elevation and plan of the said apparatus or plant showing the general arrangement thereof;

Figure 3 is an elevation of a structure for forming the hollow chamber or space, Figure 4 being a sectional plan taken along the line 4—4 in Figure 3.

Figure 5 is a sectional elevation of the delivery duct or pipe, Figure 6 being a sectional plan taken along the line 6—6 in Figure 5.

Referring to Figures 1 and 2, $a$ is the hollow chamber or space, $b$ is the stack of material to be treated, and $c$ is the delivery duct or pipe, the remaining parts of the drying apparatus or plant being hereinafter described with reference to the said figures.

The hollow chamber or space is designed or formed so that the resistance offered by the stack of material to the blast of heated air is approximately equal in all directions and at all points, in order to ensure that the material dries uniformly throughout the whole of the stack without any establishment of mould and decomposition in any portion thereof. The resistance of the stack depends not only on the nature and physical properties of the material, but also, and to a larger extent, on such factors as the porosity of the material under various thicknesses and pressures and the consolidation or rate of consolidation of the stack. As regards porosity or "penetrability", as the pressure in the stack varies at different heights from a maximum at the foot to zero at the top, its resistance can be equalized by having a greater thickness of material under a smaller pressure and a smaller thickness of material under a greater pressure; the thickness or distance which the blast of air has to penetrate should, therefore, be gradually increased from the foot to the top of the stack. The extra thicknesses of material thus required under smaller pressures at varying decreasing heights are obtained say in the case of a circular stack such as $b$, by forming within the latter a suitably designed central chamber $a$ of conical shape, the base and slope whereof are determined by and vary according to, respectively, the lowermost diameter and the size and shape of the particular stack. As regards consolidation or "setting" of the stack after building, it has been found that the extent to which a stack decreases in height due to consolidation is in the neighbourhood of twenty per cent of its original height. The resulting shrinkage and lateral expansion affect the configuration and, consequently, the resistance of the stack to an extent which depends on the dimensions of the latter and which is compensated by a corresponding alteration in the slope of the central chamber, the correct slope of the latter being that which will produce in the stack an approximate uniform resistance at all points after consolidation has taken place. A central chamber designed or formed as explained above also possesses a capacity which is in such relation to the volume of the stack as to afford the most economical results for a given air-supply. The hereinbefore discussed principles underlying the design of the central chamber apply equally well to those cases in which stacks or ricks of various shapes, for example, rectangular ones, are to be treated; in all such cases, the base of the central chamber will conform to the shape and will be proportional to the size of the base of the particular stack or rick, and the sides of the said chamber will be sloped inwardly according to the general shape and dimensions of the said stack or rick as described above. As the central chamber is in all cases in definite proportion to the size of the stack, a central chamber suitable for use in conjunction with any particular stack can be readily designed, when once the dimensions of the stack have been settled upon on the usual basis of the estimated weight of the crop in the field.

The structure illustrated in Figures 3 and 4, which is suitable for forming a central chamber in a stack $b$ of circular formation as shown in Figures 1 and 2, may be built of any convenient or available material. The said structure may comprise, for example, a suitable number of lengths of timber $f$ which are erected and arranged so as to form a conical framework, which latter is secured together by means of circular hoops $f^1$ and is covered over with wire meshing or the like in order to exclude the material to be dried and to permit of a free passage of air thereto. The upper portion of the structure is preferably made to terminate in a point, for which purpose a pointed sheet iron cap $g$ may be employed, in order to prevent any likelihood of the top of the stack being suspended on the structure owing to consolidation and thus impairing the desired requirements of equal resistance. It is further advisable for the same reason to provide or form a comparatively small cavity $g^1$ directly over the upper point of the structure as shown in Figures 1 and 2, said cavity being formed in any convenient manner, for instance, by means of one or more sacks filled with straw or the like which can be removed when the stack is sufficiently high. The hereinbefore described structure, about which the material to be dried is stacked, is naturally constructed and assembled so as to form within the completed stack a hollow central chamber or space of the requisite shape and size.

The delivery duct or pipe is designed so as to produce an equal air distribution in conjunction with the central chamber and to prevent or minimize the creation of turbulence and the formation of eddy currents within the latter due to the sudden enlargement of the streamed blast of heated air. The effect of turbulence, which is mainly dependent on the velocity of the blast on delivery, can be counteracted by delivering the air with as small a velocity as is practicable for rapid drying; it has been found that the effect of turbulence is minimized to an unappreciable extent by reducing the velocity of the blast in relation to the volume of air to one equivalent to say twice or three times the cubic content of the stack per minute, the desired reduction of velocity is effected by employing a suitably tapered or bell-mouthed delivery duct $c$ which delivers into the central chamber $a$ from the end having the larger cross-sectional area as shown in Figures 1 and 2. The dynamical head due to the velocity of the blast is thus partly converted into a statical head according to the same principle which applies to the expanding portion of a Venturi-meter in the case of hydraulics. The size and shape of the duct $c$ are determined by and varied according to the volume of air which is utilized and the pressure under which the air is forced, the ratio of the extreme cross-sectional areas of the said duct depending on the initial pressure under which the air is normally supplied.

The duct illustrated in Figures 5 and 6 consists of a tapered tube $h$ which is made of thin sheet metal and which is reinforced at suitable intervals by staying rods $h^1$. The delivery duct may, however, be obviously varied in construction and in cross-sectional shape without departing from the foregoing principles governing the design thereof.

The heated air may be obtained from any convenient or available source of supply. Air from the open atmosphere is, however, preferably raised to the requisite temperature for the purpose in view by means of a suitable heater $d$ which forms part of the drying apparatus or plant. The volume of air utilized is determined by the weight of moisture which is to be evaporated from the material in a given time at a given temperature and the degree of saturation of the air at the particular temperature adopted. The temperature at which the air is supplied depends in some degree upon the nature of the particular material, and should be sufficiently high to ensure the effective evaporation of the moisture in the latter without, however, producing any deleterious effects upon the material or the ultimate product thereof.

The heated air obtained from the heater $d$ is conveyed therefrom, as shown in Figures 1 and 2, to a chamber $e$ containing a fan or blower of the usual type which is driven by means of a tractor or other source of motive power $i$, the blast of heated air produced in the usual manner by the said fan or blower being conveyed to the central chamber $a$ by way of a suitable flexible connection $j$ extending between the fan-chamber $e$ and the delivery duct $c$.

The blowing of the stack is commenced as soon as the latter has been built about the central chamber, and is continued until the material is sufficiently dry; the stack can be dried in a few hours with a comparatively small volume of air per minute, if the temperature of the air is sufficiently high. In cases where it is found that the stack heats to an undue extent owing to excessive moisture, the blowing should be repeated until the moisture content of the crop is sufficiently reduced. In the case of hay, fermentation will not take place at temperatures say below a hundred degrees Fahrenheit; in the case of corn, however, the temperature of the stack should not be allowed to exceed say ninety degrees Fahrenheit owing to the injurious effect of excessive heat on germination.

The following definite advantages, amongst others, are secured by means of the method of drying crops artificially in accordance with the present invention. Hay of a better quality both in chemical and in feeding value, as well as a greater proportion of dry matter per acre, can be obtained; straw of a greater feeding value is likewise obtained, and, in the case of corn, hard samples of grain are available sooner, thus allowing thrashing and grinding to take place earlier than in the case of ordinarily harvested crops. Moreover, the crops, when ready for cutting, can be harvested irrespectively of the weather without the risk of further losses and the expenditure of the field labour at present necessitated by the making of hay and the stooking of corn, and, in the case of the latter, ploughing can be resumed earlier as the land is cleared without wastage of time.

What I claim is:

1. The method of drying crops artificially, which consists in forming within a stack of material to be treated a hollow central chamber the base of which conforms to the shape of the base of the particular stack to be formed and the sides of the chamber being sloped inwardly in relation to the general shape and dimensions of the said stack, whereby the thickness of material around said chamber is increased as the pressure on the material at varying heights decreases from the base toward the top of the stack and the resistance of the latter to blasts of air is approximately equalized after consolidation in all directions and at all points, and forcing heated air into the chamber at a reduced velocity of the blast consistent with the effective drying of the material thereby to minimize the creation of turbulence and eddy currents within said chamber.

2. Apparatus for drying crops artificially, comprising a structure adapted to exclude the material to be treated, said structure being shaped and dimensioned relatively to a predetermined form of stack so as to form within the material a hollow central chamber conforming at its base to the shape of the base of the stack and having its sides sloped inwardly in relation to the general shape and dimensions of the stack thereby to increase the thickness of material around said chamber as the pressure on the material at varying heights decreases from the base toward the top of the stack and to equalize the resistance of the stack to blasts of air, and means for delivering heated air under pressure and at a reduced velocity to the lower end of said structure.

3. Apparatus as set forth in claim 2, said structure comprising a wooden frame work provided with a pointed metal cap and covered with reticulated material.

4. Apparatus for drying crops artificially, comprising a structure adapted to exclude the material to be treated, said structure being shaped and dimensioned relatively to a predetermined form of stack so as to form within the material a hollow central chamber conforming at its base to the shape of the base of the stack and having its sides sloped inwardly in relation to the general shape and dimensions of the stack thereby to increase the thickness of material around said chamber as the pressure on the material at varying heights decreases from the base toward the top of the stack and to equalize the resistance of the stack to blasts of air, and a tapered tube having a comparatively thin metal wall and reinforced at intervals along its length, for delivering heated air under pressure and at a reduced velocity to the lower end of said structure.

In testimony whereof I have signed my name to this specification this fourteenth day of February, 1925.

BRYNAR JAMES OWEN.